United States Patent
Sweet et al.

(10) Patent No.: US 6,836,800 B1
(45) Date of Patent: Dec. 28, 2004

(54) MANAGING COMPUTER RESOURCES

(75) Inventors: Bruce Sweet, N. Reading, MA (US); Bruce A. Kelley, Jr., Westford, MA (US); Yuming Huang, Chelmsford, MA (US); Andrew M. Levin, Acton, MA (US); Gregory Mayo, Salem, NH (US)

(73) Assignee: NetScout Systems, Inc., Westford, MA (US)

(*) Notice: Subject to any disclaimer, the term of this patent is extended or adjusted under 35 U.S.C. 154(b) by 0 days.

(21) Appl. No.: 09/409,483

(22) Filed: Sep. 30, 1999

Related U.S. Application Data

(60) Provisional application No. 60/102,579, filed on Sep. 30, 1998.

(51) Int. Cl.$^7$ ............................................. G06F 15/173
(52) U.S. Cl. ....................... 709/224; 709/228; 709/229; 714/37
(58) Field of Search ........................ 709/295, 223–226, 709/227, 228, 229; 714/37

(56) References Cited

U.S. PATENT DOCUMENTS

| | | | |
|---|---|---|---|
| 5,577,197 A | | 11/1996 | Beck ...................... 395/183.04 |
| 5,655,081 A | * | 8/1997 | Bonnell et al. ............. 709/202 |
| 5,732,240 A | * | 3/1998 | Caccavale .................... 710/56 |
| 5,748,098 A | * | 5/1998 | Grace .......................... 370/242 |
| 5,751,964 A | * | 5/1998 | Ordanic et al. ............. 709/224 |
| 5,796,633 A | * | 8/1998 | Burgess et al. ............. 702/187 |
| 5,812,780 A | | 9/1998 | Chen et al. ............. 395/200.54 |
| 6,021,437 A | * | 2/2000 | Chen et al. .................. 709/224 |
| 6,216,163 B1 | * | 4/2001 | Bharali et al. .............. 709/224 |
| 6,321,263 B1 | * | 11/2001 | Luzzi et al. ................. 709/224 |
| 6,327,550 B1 | * | 12/2001 | Vinberg et al. ............. 702/186 |
| 6,327,677 B1 | * | 12/2001 | Garg et al. .................... 714/37 |

FOREIGN PATENT DOCUMENTS

| | | |
|---|---|---|
| GB | 2 307 318 A | 5/1997 |
| JP | 57059257 | 4/1982 |

OTHER PUBLICATIONS

Annex to PCT Communication Relating to the Results of the Partial International Search Corresponding to PCT International Application No. PCT/US99/22534; Authorized Officer: Ahmed Soliman; Date of Mailing: Feb. 11, 2000 (6 pages).

Volochine, Tania et al., 8302 IEEE Network, No. 5, Sep. 5, 1991, "Network Management and Traffic Analysis for CIC-Net", pp. 41–50.

IBM Technical Disclosure Bulletin, vol. 32, No. 9A, Feb. 1990, "Statistical Technique for Detection of Exceptional Situations in MVS Systems", pp. 25–26.

Amer, Paul D. et al., Proceedings of the Conference on Local Computer Networks, 1989, "Management of Sampled Real–Time Network Measurements", pp. 62–68.

Orchard, Robert A., Conference Proceedings of CMG '85: International Conference on the Management and Performance Evaluation of Computer Systems, Dec. 9–13, 1985, "A Mathematical Approach to the Management of Service Requirements", pp. 780–786.

Borella, M.S. et al., "WANDS: Wide–Area Network Delay Simulator", Proceeding of the IEEE 7$^{th}$ International Workshop on Network and Operating Systems Support for Digital Audio and Video (Cat No. 97TH8259), pp. 85–92, XP002131053, 1997, New York, NY.

(List continued on next page.)

Primary Examiner—David Wiley
Assistant Examiner—Phuoc Nguyen
(74) Attorney, Agent, or Firm—Testa Hurwitz & Thibeault LLP

(57) ABSTRACT

Computer resources are managed by a method that includes deriving, from historical measurement information for a computer resource, values for statistical variables, and, based on the values, determining whether a behavioral pattern for the computer resource is represented in the historical measurement information.

54 Claims, 15 Drawing Sheets

OTHER PUBLICATIONS

Larsen, A.K., "All Eyes on IP Traffic. New Apps Can Monitor Internet and Intranet Traffic, But Do They Deliver Enough Data to Hold ISPS to Their Promises?", Data Communications, McGraw Hill, New York, vol. 26, No. 4, Mar. 21, 1997, pp. 54–62.

PCT International Search Report Corresponding to International Application No. PCT/US99/22787; Authorized Officer: Herreman, G.; Date of Mailing: Mar. 6, 2000 (4 pages).

* cited by examiner

MANAGING COMPUTER RESOURCES

CROSS-REFERENCE TO RELATED APPLICATIONS

This application claims the benefit of U.S. Provisional Application Ser. No. 60/102,579 entitled "MANAGING COMPUTER NETWORK RESOURCES" filed on Sep. 30, 1998, which is incorporated herein.

BACKGROUND OF THE INVENTION

A computer resources manager, such as an information technology manager or a network administrator, is responsible for helping to make sure that computer resources such as a software application, a computer system, or a network such as an IP or frame relay network are performing satisfactorily in accordance with end-user needs. Since the computer resources, such as network resources including the available bandwidth on the network, are relied upon, the manager should manage the computer resources in a proactive manner to help ensure effective performance. For example, realistic service level expectations and useful metrics may need to be developed. End-users may demand exceptional service from the computer resources at all hours and may have little patience with or insight into problems such as slow network response times.

Typically, a network or other computer resource operates in patterns of high and low utilization, with corresponding changes in characteristics such as response times. For example, if archival data copying procedures known as "data back-ups" are executed at the end of a day by sending large amounts of data across a network, such procedures may have an adverse effect at that time on response times for software programs that interact with the end-users by sending data across the network ("interactive applications"). In other examples, an electronic mail ("E-mail") server's response time may worsen during early morning working hours when end-users arrive at work and initially open their E-mail accounts, or World Wide Web ("Web") servers and gateways may have added congestion during lunch hours when end-users browse the Web for recreation. In many instances, variations in utilization and the results of such variations, such as inconsistent response times, reflect normal patterns of network traffic or other computer resource utilization resulting from cyclical business processes.

In some cases, more productivity is lost due to variations in application response times than is lost due to consistently slow performance. Further, a deviation from normal patterns of utilization may indicate an important event that requires attention, such as the failure of a critical application.

Existing historical reporting tools for networks typically calculate a daily statistical mean (i.e., average) value for network utilization. As a result, these tools allow the generation of alert or alarm indications or other performance exceptions by detecting above average utilization for a day. However, in at least some cases, the exceptions may in fact be false alarms generated as a result of normal variations that represent times of acceptably high utilization. Also, significant trends and patterns in network performance are typically not represented in the statistical mean value, which lack of representation may lead to inaccurate conclusions about the capacity or configuration of the network.

SUMMARY OF THE INVENTION

Computer resources are managed by a method that includes deriving, from historical measurement information for a computer resource, values for statistical variables, and, based on the values, determining whether a behavioral pattern for the computer resource is represented in the historical measurement information.

Different aspects of the invention allow one or more of the following. Network and other computer resource usage can be tracked at a highly granular level, enabling highly meaningful analysis and presentation of information. In the case of a network, performance thresholds can be automatically adapted and kept current, relieving the network administrator of at least some of the burden of analysis and configuration of the network. Rich details of network traffic patterns can be exposed and alert and alarm thresholds can be automatically tuned, allowing effective bandwidth management, capacity planning, and development of realistic service level expectations based on objective information. In at least some cases, network patterns can be analyzed on an hour-by-hour or other day-fractional historical basis, and overgeneration of alarms ("alarm floods") can be avoided, by generating alarms for meaningful events only.

Highly precise baselines of normal performance can be provided, enabling the establishment of suitable application priorities, enhancing the effectiveness of bandwidth management tools, and allowing effective, informed decisions to be made about network performance and capacity. Highly granular indications of which traffic loads are normal and which are aberrant can be provided, allowing network administrators to make effective decisions about network tuning and capacity upgrades, optimize performance during peak traffic periods for critical applications, and tolerate occasional slow-downs for less critical applications. Information regarding trade-offs associated with such optimization or tolerance can be provided.

Information about a network's behavioral patterns can be provided to end-users, who can then anticipate slow-downs at particular times, and to network maintenance organizations, to allow service level agreements ("SLAs") to be established at an effectively fine level of granularity, with recognition of the trade-offs between the cost of service and upgrades and the cost of occasional slow-downs.

Other features and advantages will become apparent from the following description, including the drawings, and from the claims.

DETAILED DESCRIPTION

A signature is a statistically detectable pattern in measurement data. For example, if data gathered over time about a particular point on a computer network indicates that data traffic through the point is almost always either nil or very light during the hour of 2:00 AM to 3:00 AM each day, it may be concluded that the gathered data includes a "light traffic" signature for the 2:00 AM to 3:00 AM hour. In other words, light data traffic is particularly characteristic of the 2:00 AM to 3:00 AM hour, which renders an instance of moderate or heavy data traffic during that hour rare and unexpected. Subsequently, in such a case, the signature may be used to establish an alarm threshold (i.e., an alert threshold) to allow a network manager to be alerted automatically to unusually high data traffic, due perhaps to a network malfunction or unauthorized use of the network, during the 2:00 AM to 3:00 AM hour.

A signature may be found in connection with measurements of response time, which is the round trip time of a transaction. For instance, data gathered over time about the response time of a World-Wide Web ("Web") site such as www.uspto.gov may indicate that during the hour of 10:00 AM to 11:00 AM each weekday, a particular page on the Web site is almost always fully retrieved about ten seconds after being requested. If so, the gathered data includes a ten second response time signature for the 10:00 AM to 11:00 AM weekday hour, which signature can be used to allow the network manager to be alerted automatically in an instance when the response time exceeds ten seconds by a significant amount, perhaps due to network congestion or a malfunction at the Web site.

In general, a signature may be found at any point in a computer system, including at any network layer, such as at a network segment or other network infrastructure layer entity, at a domain name server or other IP services layer entity, or at a Web server application or other application layer entity.

Figure 1:
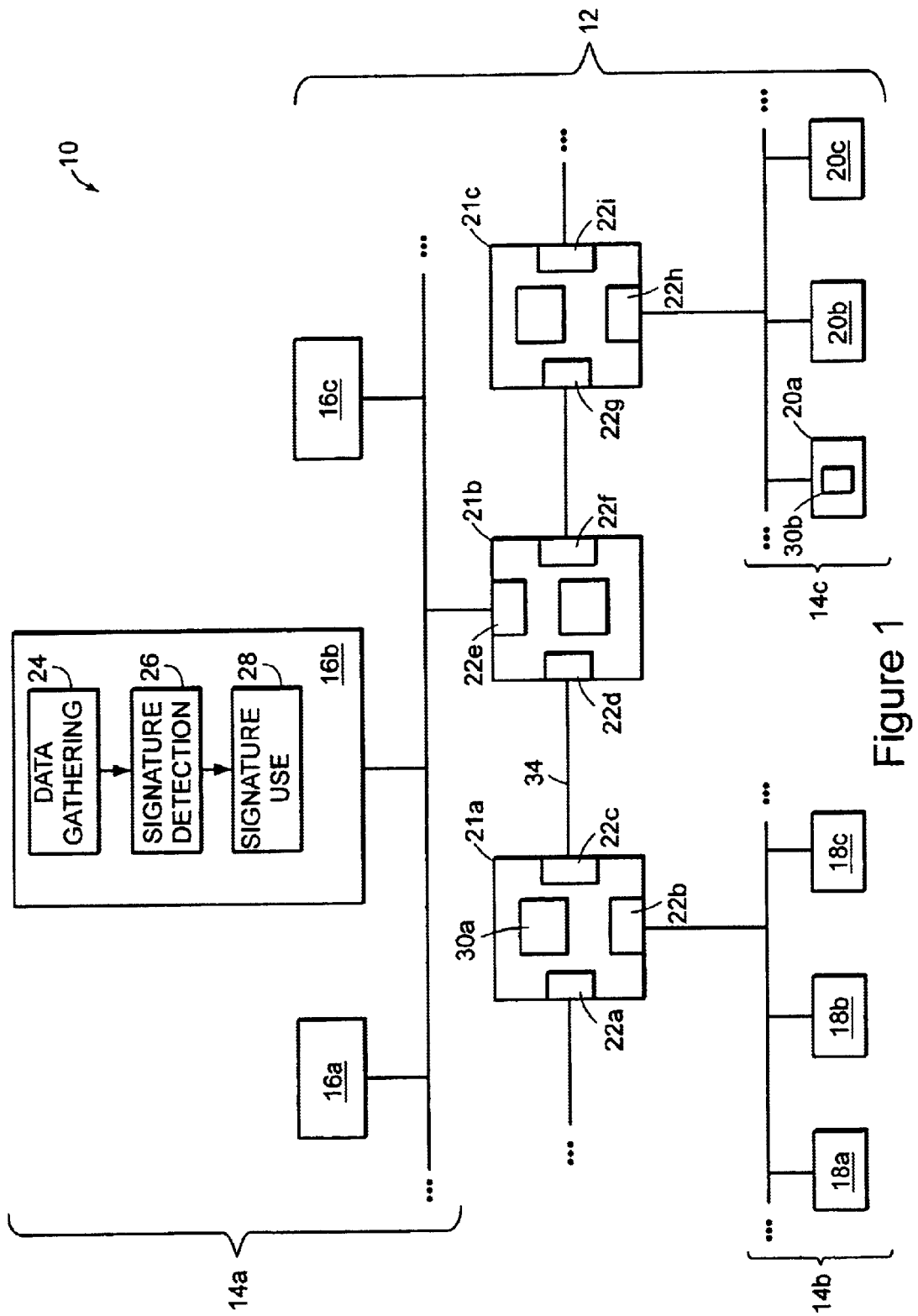
FIGS. 1 and 3 are block diagrams of computer-based systems.

FIG. 1 illustrates a system 10 for automatic signature detection and use on a network 12, such as the Internet or an intranet using Internet protocols, having network portions 14a–14c including computers 16a–16c, 18a–18c, and 20a–20c, respectively. In the network, router computers 21a–21c connect the network portions by interfaces 22a–22i to allow data traffic to flow among the network portions.

At least of one of the computers, such as computer 16b, runs data gathering software 24, signature detection software 26, and signature use software 28, so that (FIG. 2) data is gathered about the network (step 1010), the gathered data is analyzed to determine whether a signature exists (step 1020), and if a signature exists, the signature is used for purposes such as generating alarms for unusual activity (or inactivity), reporting on the status of the network, and planning changes such as upgrades to the network (step 1030).

As described in more detail below, depending on the nature of the data being gathered, the data gathering software may include software agents executing at other points in the network, such as agents 30a and 30b executing at router 21a and computer 20a, respectively.

Figure 3:
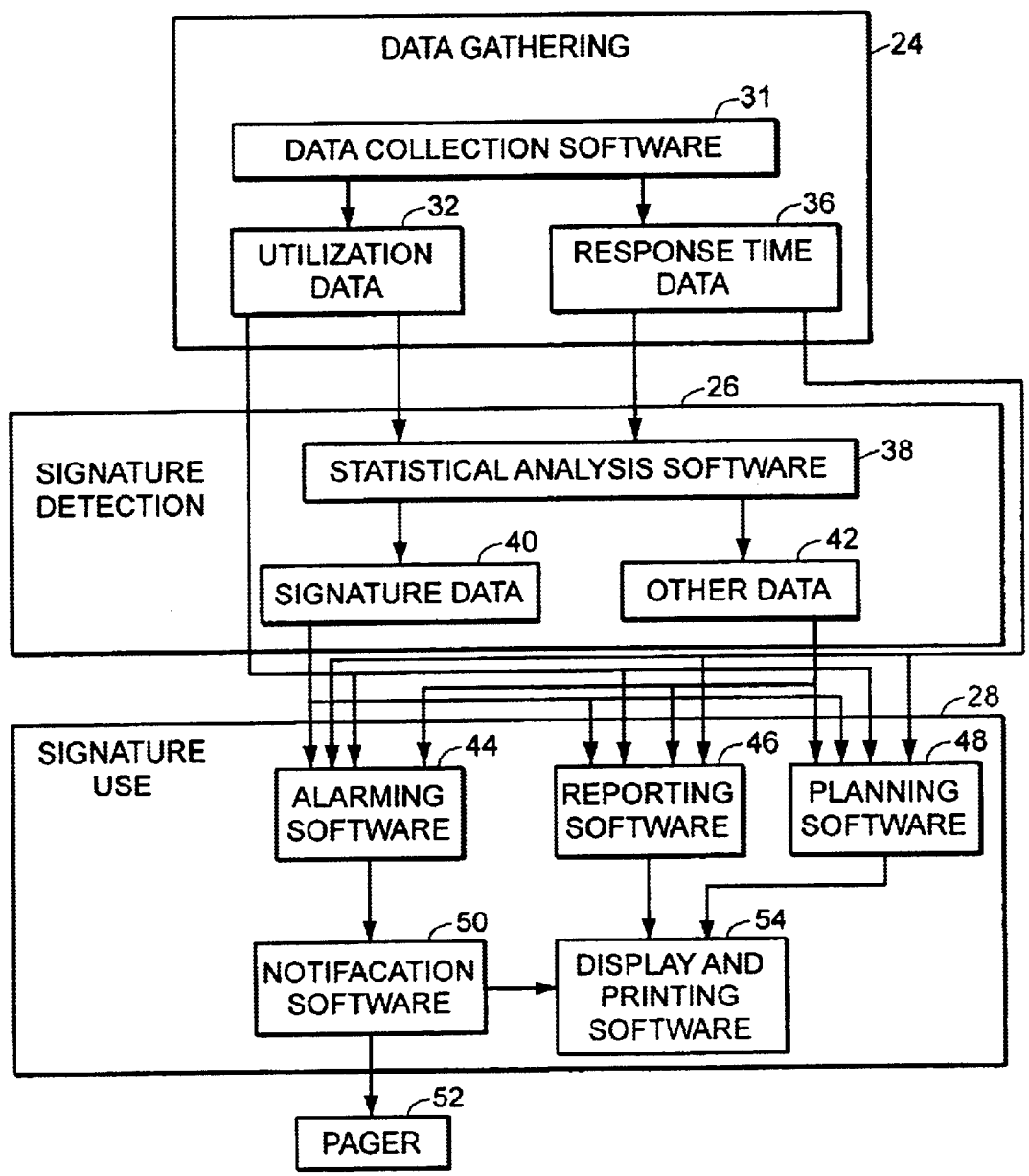

As shown in FIG. 3, the data gathering software may include data collection software 31 and the gathered data may include utilization data 32, such as data regarding how much of the bandwidth of an individual network link such as link 34 is being used, or response time data 36, such as data indicating how long it takes for computer 20a to receive a response to a request sent to computer 18b.

The gathered data may include or be derived from information collected at a router. See Marshall T. Rose, The Simple Book: An Introduction to Networking Management, Prentice Hall Press (2d ed., April 1996), for information regarding retrieving information collected by routers and other computers on a network. For example, the data collection software may use packets sent by an SNMP protocol to poll for the contents of packet counters maintained by routers, to determine information such as the number of packets that have been transmitted to or from the interfaces of each router. In a case in which a counter maintains an absolute count, the number of packets that are transmitted during a specified period of time may be determined by subtracting a reading taken from the counter at the beginning of the period from a reading taken from the counter at the end of the period.

Response time information may be acquired by running software, such as software at computer 16a or router 21b, that is configured to send requests for information to a source, such as at regular intervals to a Web application running on computer 20c, and to measure in each instance the amount of time that passes between the sending of the request and the receiving of a corresponding response. The source may be a domain name server or an electronic mail server, and the requested information may include an IP address that corresponds to a URL, or a dummy electronic mail message stored at the source.

In specific embodiments, the gathered data may include or be derived from data provided by existing software that tracks traffic across network segments, or monitors Lotus Notes or other application, or a Web site, counter values or other information that may represent packets received at an interface or other actual instances of use of a computer resource, or response time data or other information that represents the results of dummy requests for information or other simulated use of a computer resource. In one embodiment in the case of simulated use, agent software is used that allows an end-user to specify a URL and then executes according to an HTTP protocol to attempt to download all or a portion of a Web page from the Web site location identified by the URL. Software may also be used that emulates actions of a TCP/IP stack system to execute a domain name server protocol as part of an attempt to determine a numeric IP address that corresponds to a domain name. Other software that is used may emulate an end-user's use of an SAP system, or may perform attempts to log in to an electronic mail server.

Data samples may be stored initially in a semiconductor or other fast-access memory immediately after being acquired, and then may be copied to a database such as an Oracle server database in a hard disk or other mass storage memory at specified times such as at every hour or when processing time is available and network traffic is low, or at other advantageous times.

The signature detection software includes statistical analysis software 38 that derives signature data 40 and other data 42 from the gathered data. The other data may include data needed for subsequent calculations, or data for statistical correlation or for trending predictions. The signature use software may include one or more of the following that respond to at least the signature data: alarming software 44, reporting software 46, and planning software 48; and may also include or be able to direct notification software 50, such as software driving a pager 52, and display and printing software 54. The notification software may include software that relies on push technology to deliver information to subscribers such as stock ticker software, logger software, a Java-based display applet, or a telephone or electronic mail system. The notification software may include software that generates simple network management protocol ("SNMP") traps.

Figure 4:
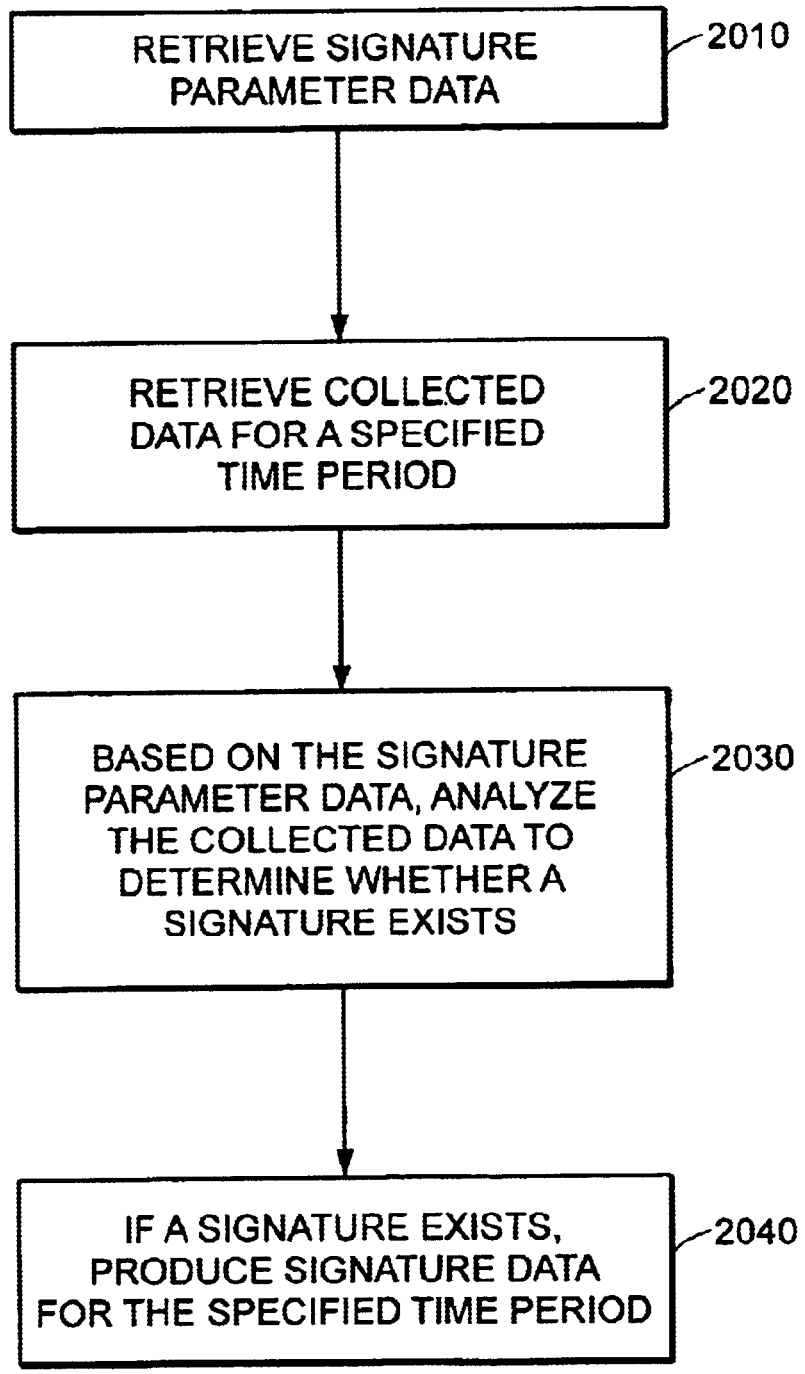

In general (FIG. 4), the statistical analysis software executes by retrieving signature parameter data (step 2010), retrieving collected data for a specified time period (step 2020), based on the signature parameter data, analyzing the collected data to determine whether a signature exists (step 2030), and, if a signature is determined to exist, producing signature data for the specified time period (step 2040). For example, the specified time period may be for 3:00 PM to 4:00 PM each weekday for the last thirty days. The statistical analysis software may also refer to a business day schedule to help make the data more meaningful, such as by excluding consideration of data collected on holidays or during scheduled service, or by using data collected on Tuesdays after long weekends together with data collected on Mondays. An exclusion of data for all or part of a day may be designated in advance or in retrospect.

Figure 5:
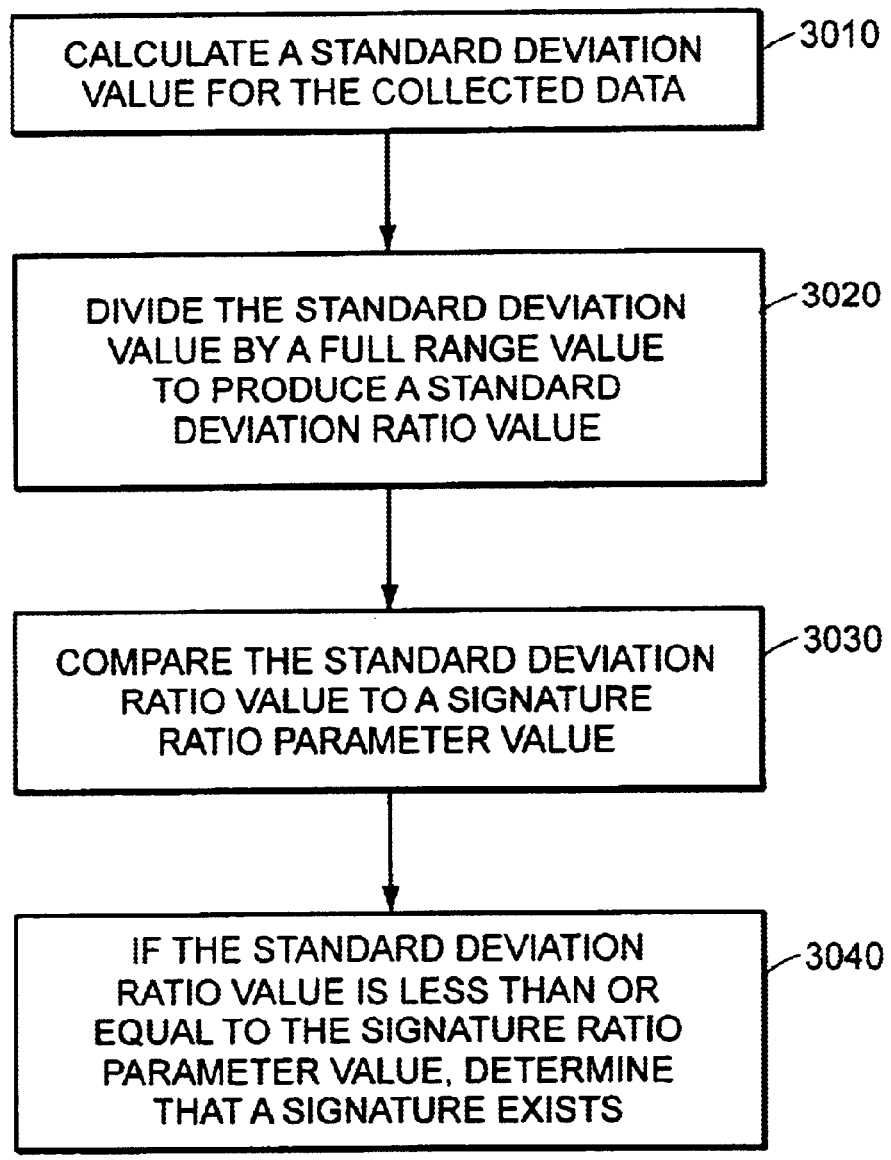

FIG. 5 illustrates an example in which a signature is determined to exist if a large portion of the collected data falls within a narrow range of values, i.e., if the collected data has a standard deviation that is smaller than a specified size. The standard deviation represents the average amount by which the collected data varies from the mean of the collected data, and can be used as a measure of the extent to which the collected data is spread out over a specified range: a smaller standard deviation indicates that the collected data is less spread out. A standard deviation value is calculated, as described below, for the collected data (step 3010), and is divided by a full range value from the signature parameter data to produce a standard deviation ratio value (step 3020). The standard deviation ratio value is compared to a signature ratio parameter value (step 3030). If the standard deviation ratio value is less than or equal to the signature ratio parameter value, it is determined that a signature exists (step 3040).

For example, if the calculated standard deviation value is 3500, representing 3500 megabits of data in an hour, and the full range value is 35,000, representing a network link having a maximum bandwidth of 35,000 megabits per hour, the standard deviation ratio value is 10%, representing one-tenth of the maximum bandwidth. In such a case, if the signature ratio parameter value is 15%, it is determined that a signature exists, because the standard deviation ratio value (10%) is less than the signature ratio parameter value.

The signature data that is produced may include alarm thresholds that may be arranged relative to the average value and that may be independent of the standard deviation. For example, if the average value for the 3:00 PM to 4:00 PM weekday hour is 10,000 megabits, the alarm thresholds for that hour may be set at 6,000 megabits and 14,000 megabits, so that an alarm is generated if the data traffic during a future 3:00 PM to 4:00 PM hour deviates from the average by more than 4,000 megabits, which may indicate a network malfunction.

Thus, meaningful alarm thresholds are automatically selected and are automatically adjusted over time as data is collected.

Figure 6:
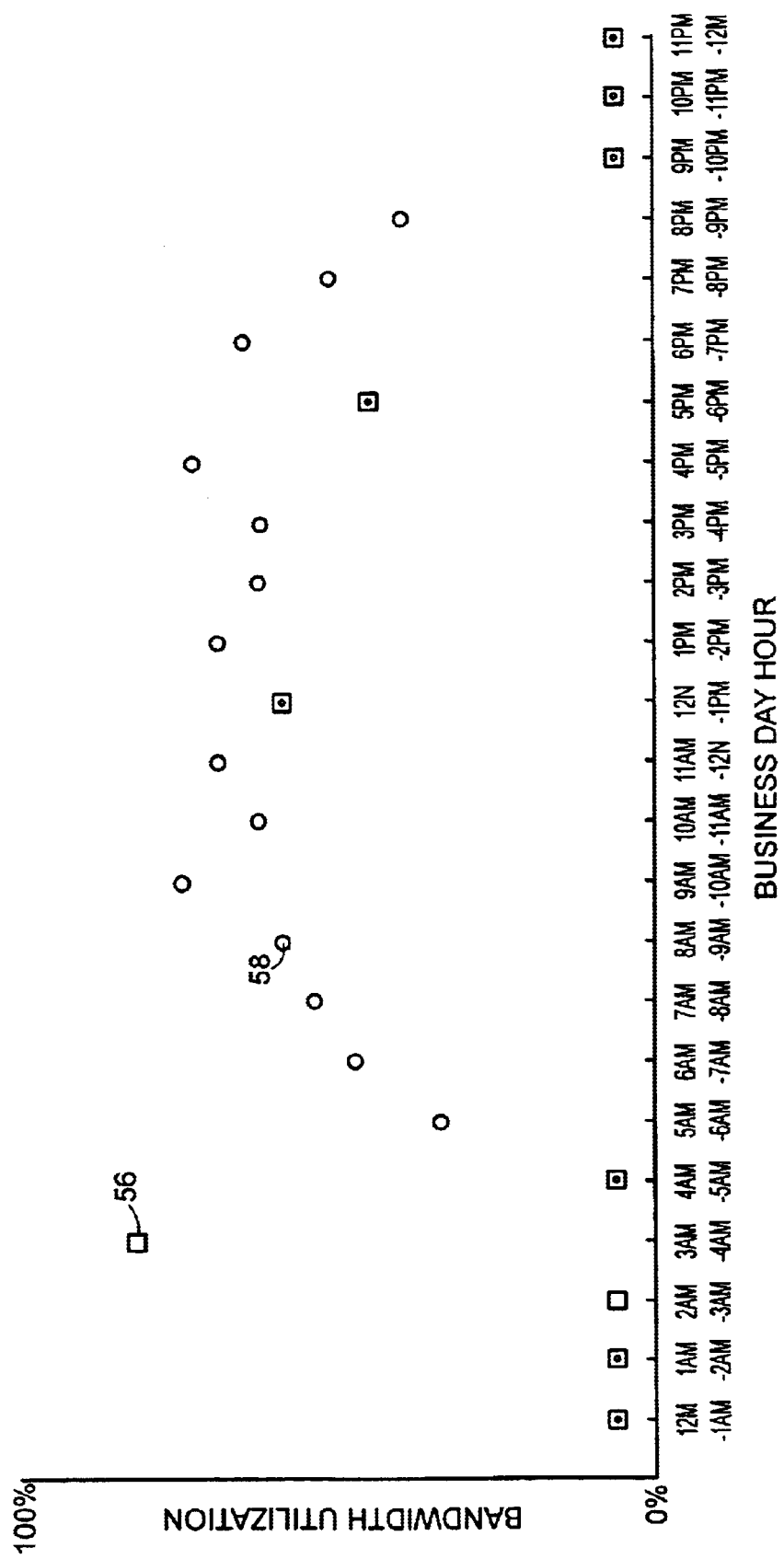
FIGS. 6 and 8–15 are diagrams of computer data.
Figure 7:
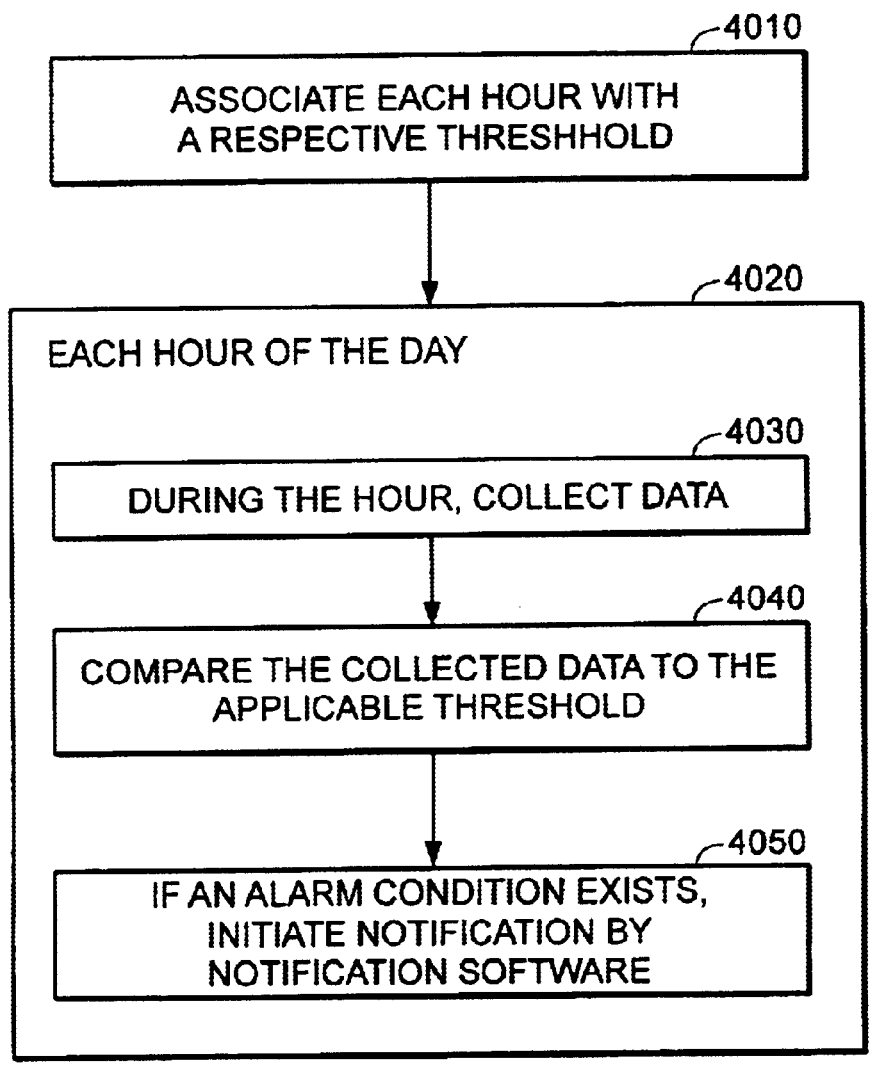

FIGS. 6 and 7 illustrate an example of an alarm-oriented use of the signature. FIG. 6 illustrates a plot that may be produced by the reporting software and the display and printing software for a particular point in the network. In the plot, which has a bandwidth utilization axis and a business day hour axis, each hour is associated with either a square or a circle, each indicating a basis for one or more alarm thresholds (as described below). Each square such as square 56 signifies that a bandwidth utilization signature was detected for the associated hour, and is positioned on the plot to indicate the average bandwidth utilization value for the collected data for the associated hour. Each circle such as circle 58 signifies that no bandwidth utilization signature was detected for the associated hour, and is positioned to indicate a 90th percentile value (described below). Reports such as the plot may be produced by a Java-based Web browser application reading from a database of gathered data. Access to the database may be restricted by security measures so that the database may be stored in a location that is accessible from virtually any point on the Internet without rendering the database contents public.

FIG. 7 illustrates real-time hour-by-hour use of alarm thresholds such as the thresholds associated with the squares and circles in FIG. 6. As shown in FIG. 7, the following steps are executed. In advance, each hour is associated with a respective threshold: if the hour is associated with a signature-based alarm threshold, the signature-based alarm threshold is selected as the applicable alarm threshold; otherwise, another threshold is selected (step 4010). For each hour of the day (step 4020), data is collected during the hour (step 4030); the collected data is compared to the applicable threshold to determine whether an alarm condition exists (step 4040); and if an alarm condition exists, notification by the notification software is initiated (step 4050). (Alternatively, the threshold may be selected after the data is collected.)

Figure 8:
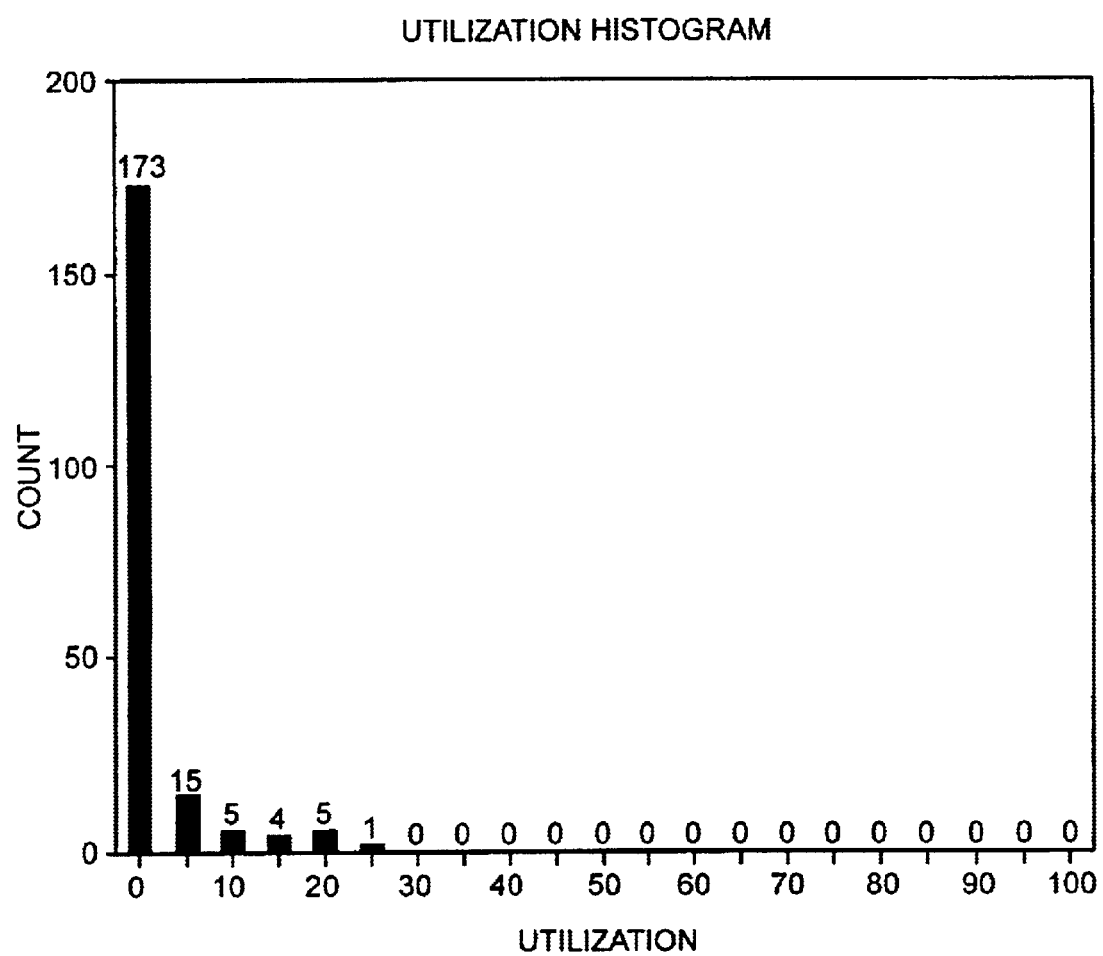

For example, the collected data may include bandwidth utilization data and the hour may be 3:00 AM to 4:00 AM which may associated with a signature-based alarm threshold as shown in FIG. 8. The other threshold may be a 90th percentile threshold, and the notification may be by pager by pager software.

Alarm threshold setting and other features of the signature-based system rely on statistical principles as described below. The average value of a set of samples such as measured data points is referred to as the mean and is usually denoted by the symbol $\mu$. The mean carries no indication of the extent to which the samples in the set deviate from the mean. The average of this deviation is known as the standard deviation and is usually denoted by the symbol $\sigma$. The square of the standard deviation is referred to as the variance and is usually denoted by the symbol $\sigma^2$.

Covariance and correlation indicate the relationships between two sets of samples that are scaled to be independent of the unit of measurement. The covariance of the two sets is produced by subtracting the product of the averages of the two sets from the average of the products of corresponding samples in the two sets. The correlation is usually presented as a normalized value known as the correlation coefficient, which is the result of dividing the covariance of the two sets by the product of their standard deviations. The correlation coefficient is usually denoted by the symbol p.

Correlation can be used to help determine whether large-magnitude samples in one set of samples are associated with large-magnitude samples in another set of samples ("positive correlation"), whether small-magnitude samples of one set are associated with large-magnitude samples of the other ("negative correlation"), and whether the magnitudes of the samples in the two sets are unrelated (i.e., correlation is near zero).

Percentile is a measure of position in a set of samples. A k-th percentile $P_k$ is a number value such that at most k% of the samples in the set have values less than $P_k$ and at most (100-k)% of the samples have values greater than $P_k$.

Probability density distributions ("pdfs") are properties of sets of samples. The pdf of a normal (also known as "Gaussian") random variable x is given as:

$$f_x^{(x)} = \frac{1}{\sqrt{2\pi\sigma^2}} e^{-\frac{1}{2}[\frac{x-\mu}{\sigma}]^2}$$

There are two independent parameters in the Gaussian pdf: $\sigma$, the standard deviation and $\mu$, the mean. A graphical representation of the Gaussian pdf is known as the "bell curve". The probability that the value of a Gaussian random variable is less than or equal to b and greater than a may be calculated as the integral of the Gaussian pdf.

$$p[a < x \leq b] = \frac{1}{\sqrt{2\pi\sigma^2}} \int_a^b e^{-\frac{1}{2}\left[\frac{x-\mu}{\sigma}\right]^2} dx$$

$$= erf\left(\frac{b-\mu}{\sigma}\right) - erf\left(\frac{a-\mu}{\sigma}\right)$$

The function erf(x) shown and tabulated below is known as the error function.

$$erf(x) = \frac{1}{\sqrt{2\pi}} \int_0^x e^{-\frac{1}{2}t^2} dt$$

| X | 0.5 | 1 | 1.5 | 2 | 2.5 | 3 | 3.5 | 4 |
|---|---|---|---|---|---|---|---|---|
| Erf(x) | 0.1915 | 0.3413 | 0.4332 | 0.4772 | 0.4938 | 0.4986 | 0.4998 | 0.5 |

The Gaussian pdf has a property known as the 3σ property that is derived from the equations discussed above:

About 68% of the samples have values within one standard deviation of the mean ($\mu \pm \sigma$), about 95% of the samples have values within two standard deviations of the mean ($\mu \pm 2\sigma$), and about 99% of the samples have values within three standard deviations of the mean ($\mu \pm 3\sigma$).

A Poisson pdf is described as:

$$f_x(x) = \frac{1}{x!} e^{-\mu} \mu^x$$

An important feature of the Poisson pdf is that the mean and the variance are equal and therefore the standard deviation is equal to the square root of the mean:

$$\sigma = \sqrt{\mu}$$

A graphical representation of the Poisson pdf has a shape similar to the shape of the Gaussian bell curve.

An exponential pdf is described as:

$$f_x(x) = \frac{1}{\mu} e^{-\frac{x}{\mu}}$$

An important feature of the exponential pdf is that the standard deviation is equal to the mean, i.e., $\sigma = \mu$. In a set of samples that conforms to the exponential pdf, 63% of the samples have values that are less than the mean, 86% of the samples have values that are within one standard deviation of the mean, and 95% of samples have values that are within two standard deviations of the mean.

In an actual network environment, only approximations of these ideal pdfs are found. Typically, a series of response time or bandwidth utilization measurements in a network are approximately normally distributed or approximately exponentially distributed.

The signature detection software also relies on two principles in statistical theory known as the Law of Large Numbers ("LLN") and the Central Limit Theorem ("CLT"). LLN holds that the mean of the values of a large number of samples tends to approach the mean of the values of an infinite number of samples, and is the theoretical basis for estimating the mean from measurements. CLT holds that the pdf of the sum of a large number of random variables tends towards the Gaussian pdf.

FIGS. 8–15 present example histograms derived from samples representing actual network performance measurements for bandwidth utilization and response time. The accuracy of the histograms depends on the accuracy of the data collection. In each histogram, the Y-axis represents the number of occurrences ("count"). If the Y values were normalized, each histogram would approximate an exponential or Gaussian pdf.

Figure 2:
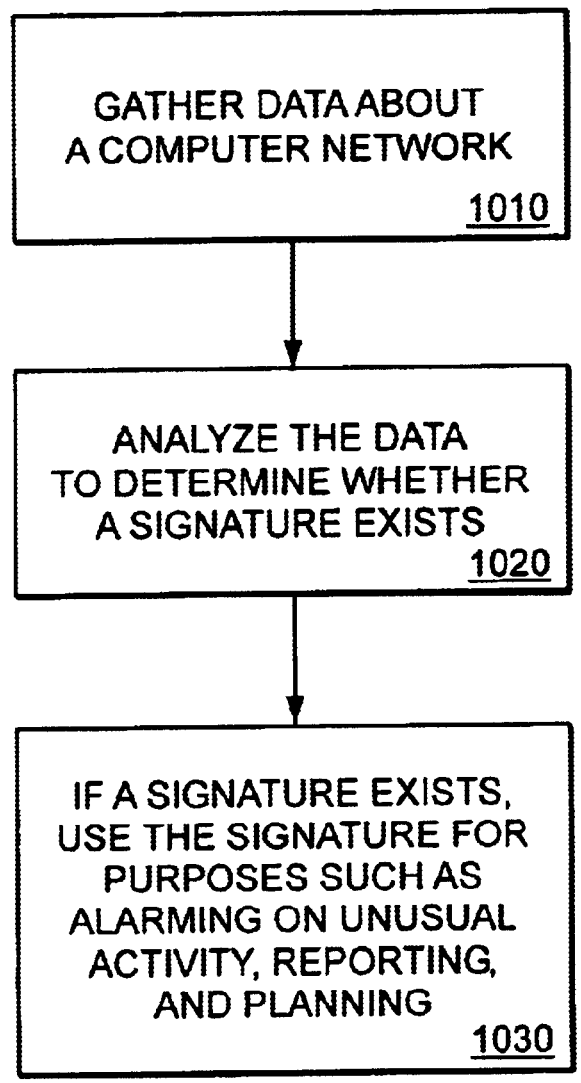
FIGS. 2, 4–5, and 7 are flow diagrams of computer-based procedures.
Figure 9:
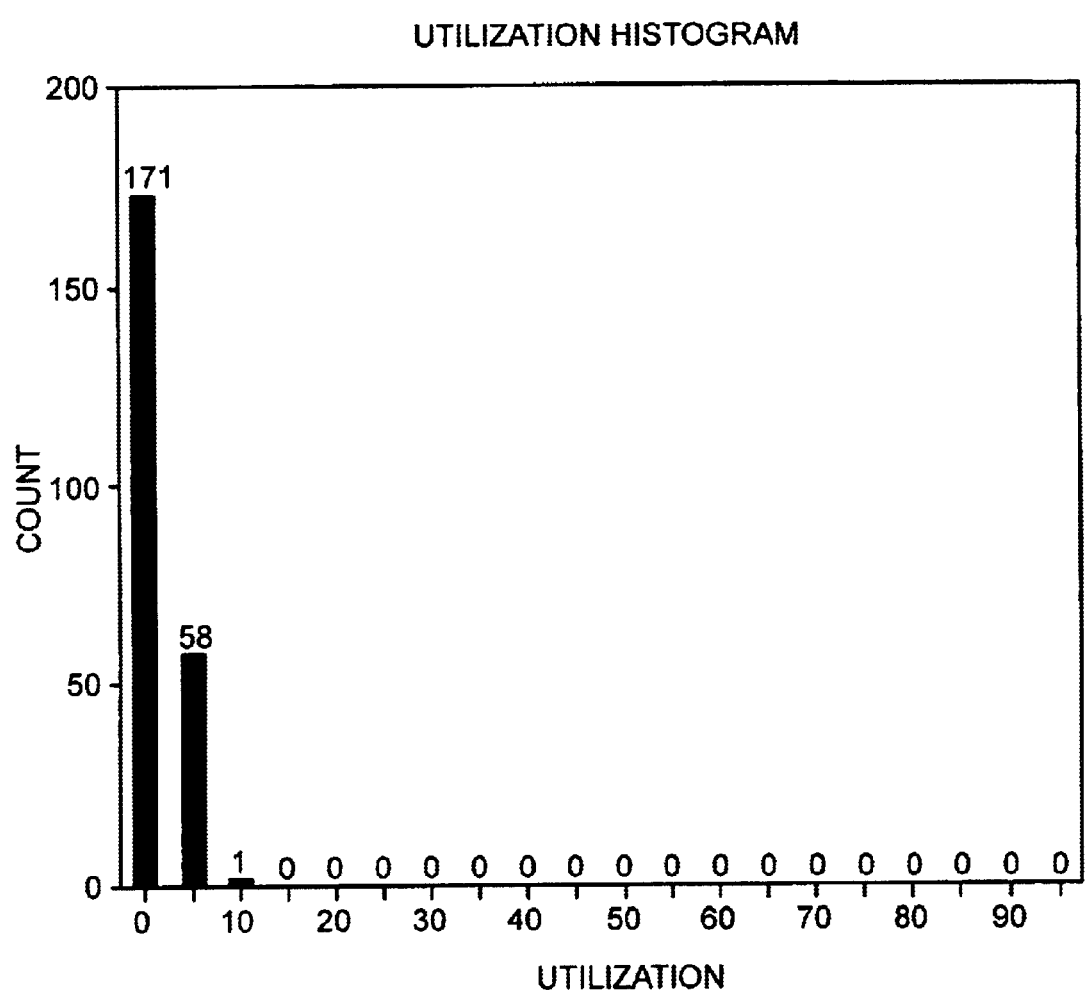
Figure 10:
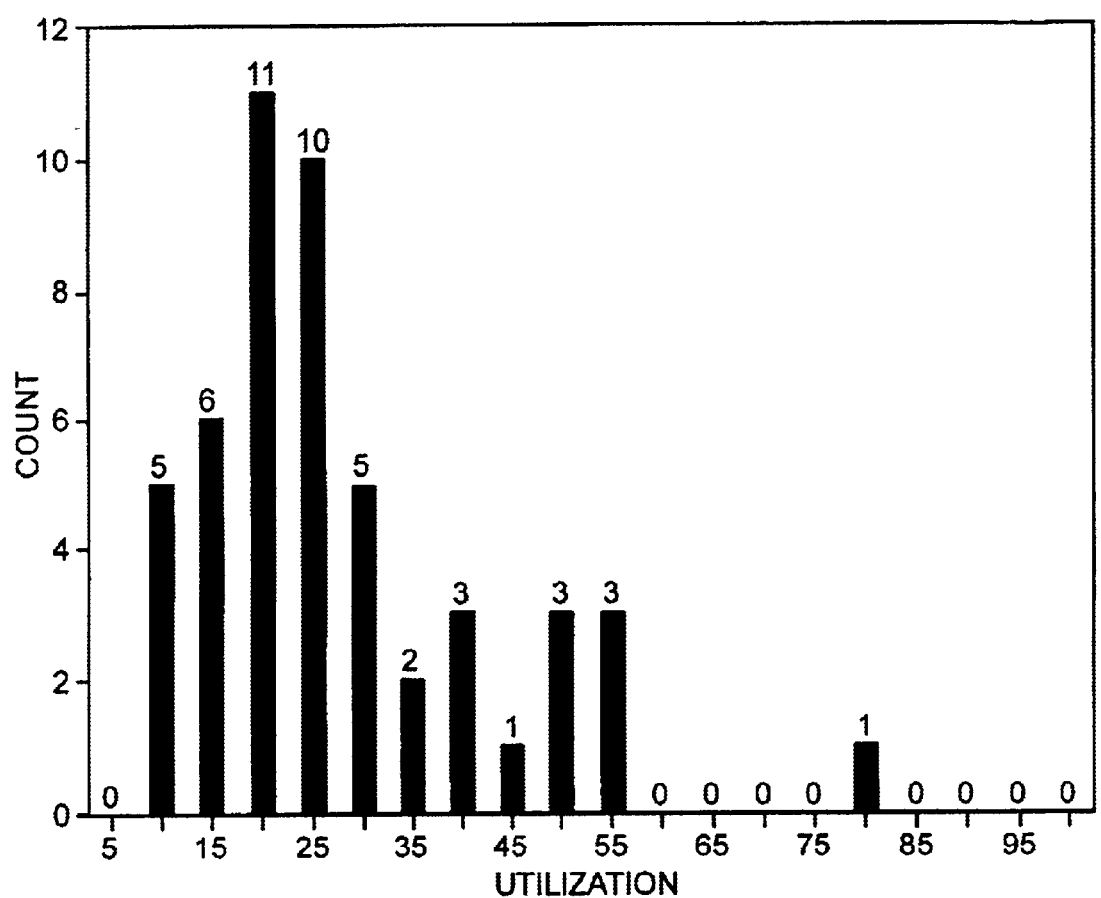
Figure 11:
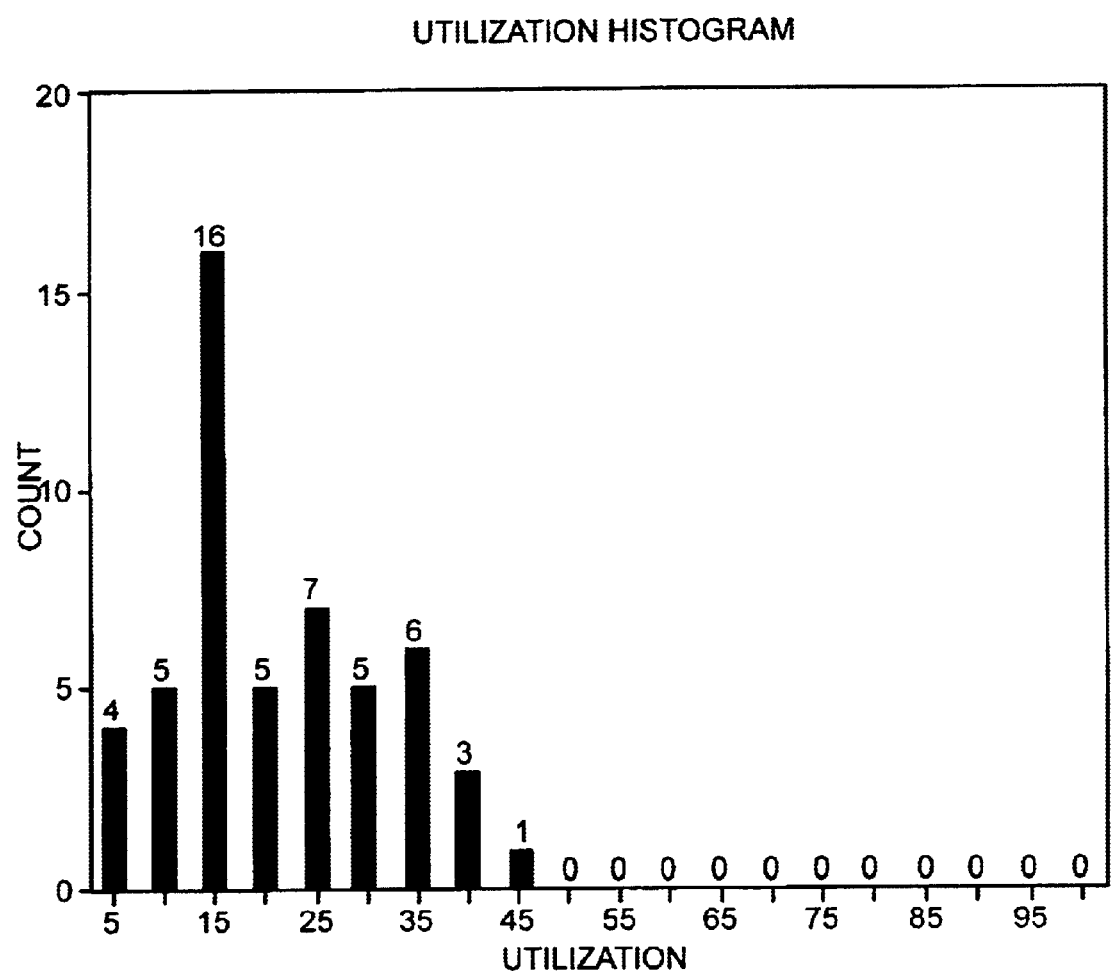
Figure 12:
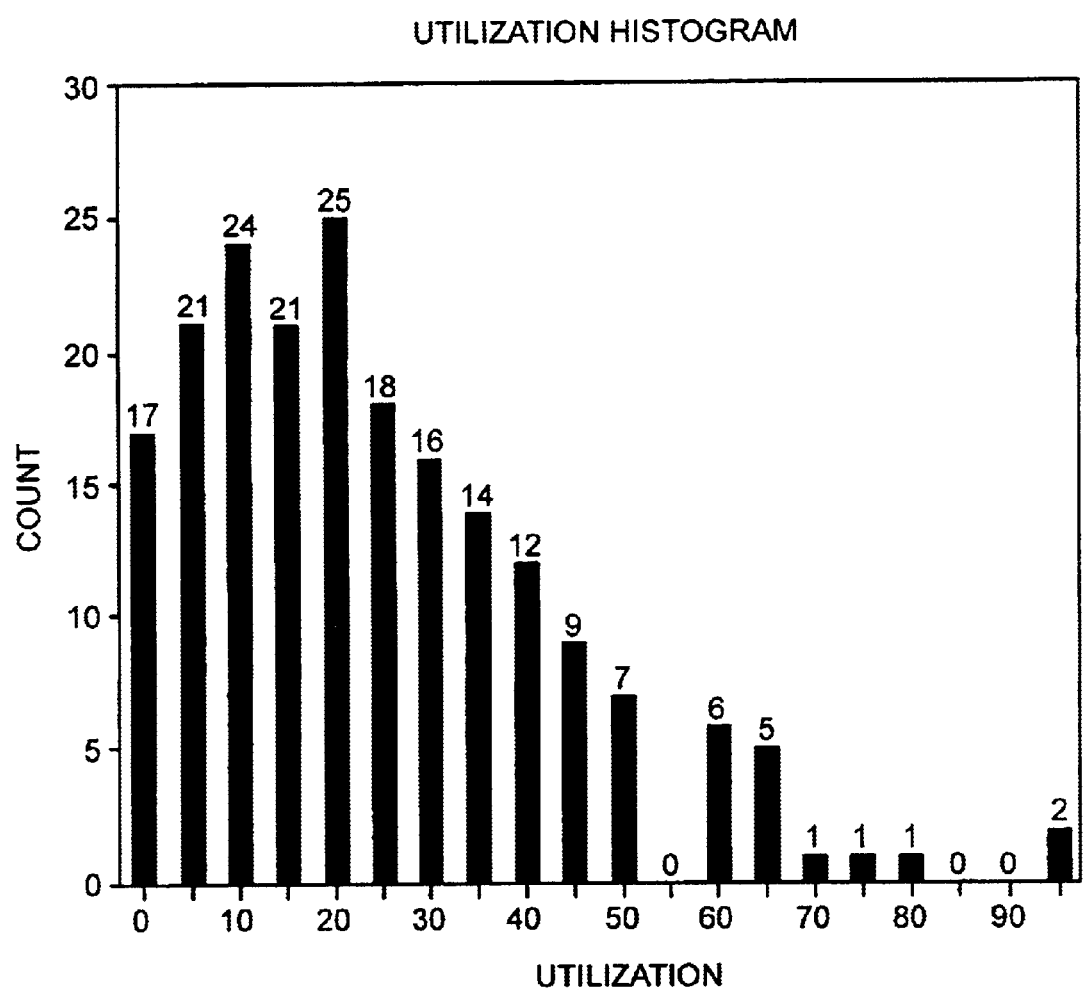
Figure 13:
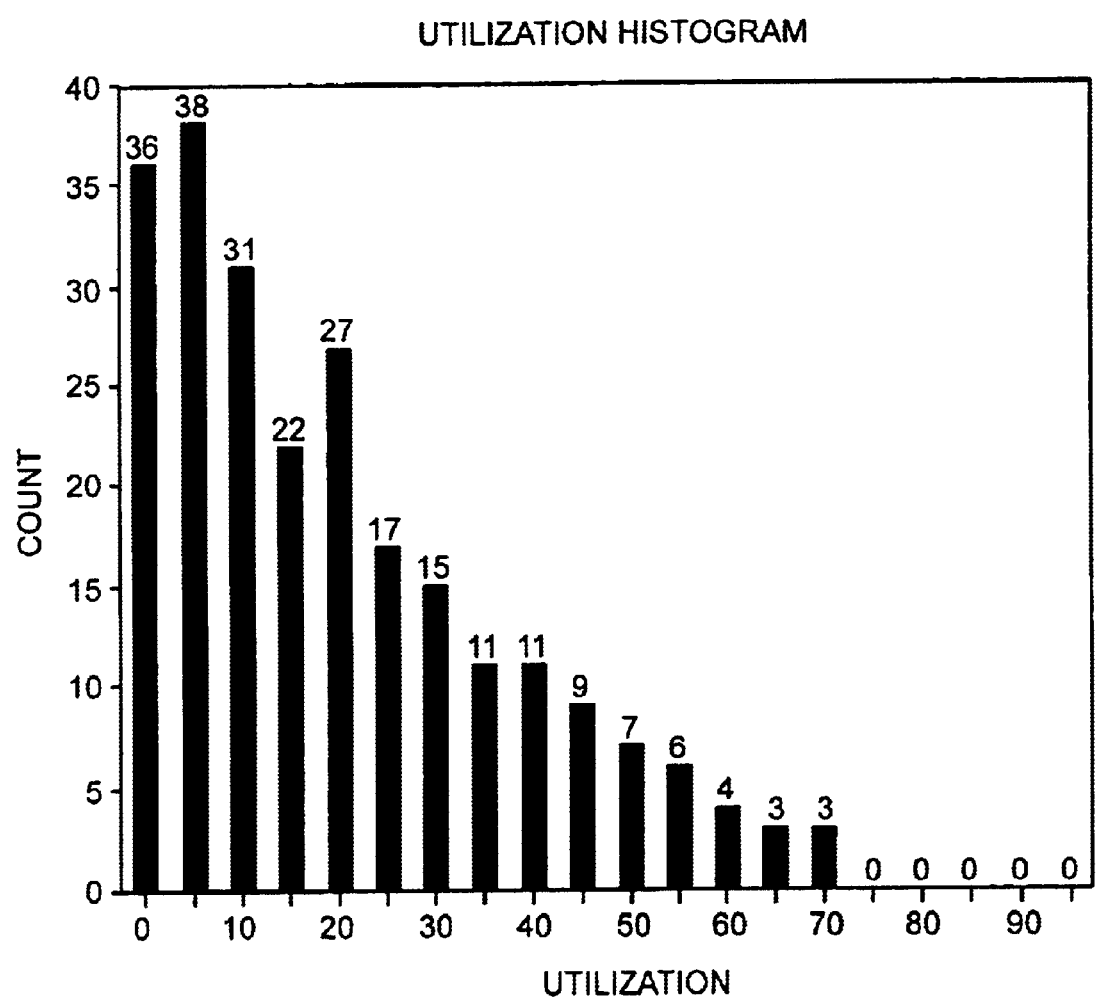

In FIGS. 8 and 9, histograms are shown for point to point output utilization on an interface of a Cisco router, such as interface 22d of router 21b in FIG. 2, for two different hours: 2:00 AM to 3:00 AM, and 4:00 PM to 5:00 PM, respectively. The histograms represent 204 and 203 samples and have means of 3.3 and 3.53, standard deviations of 4.6 and 2.3, and 90th percentile values ("90 ps") of 5.47 and 6.8, respectively.

FIGS. 10–13 show histograms for point to point input utilization on the same interface at other times. The histograms are for 3:00 PM to 4:00 PM, 2:00 AM to 3:00 AM, 1:00 PM to 2:00 PM, and 10:00 AM to 11:00, and represent 50, 51, 200, and 240 samples, respectively. The means are 25.23, 23.5, 27, and 22.5, the standard deviations are 14.12, 10.6, 19, and 17.8, and the ninetieth percentile values are 49.7, 39.1, 51, and 49.5, respectively.

Figure 14:
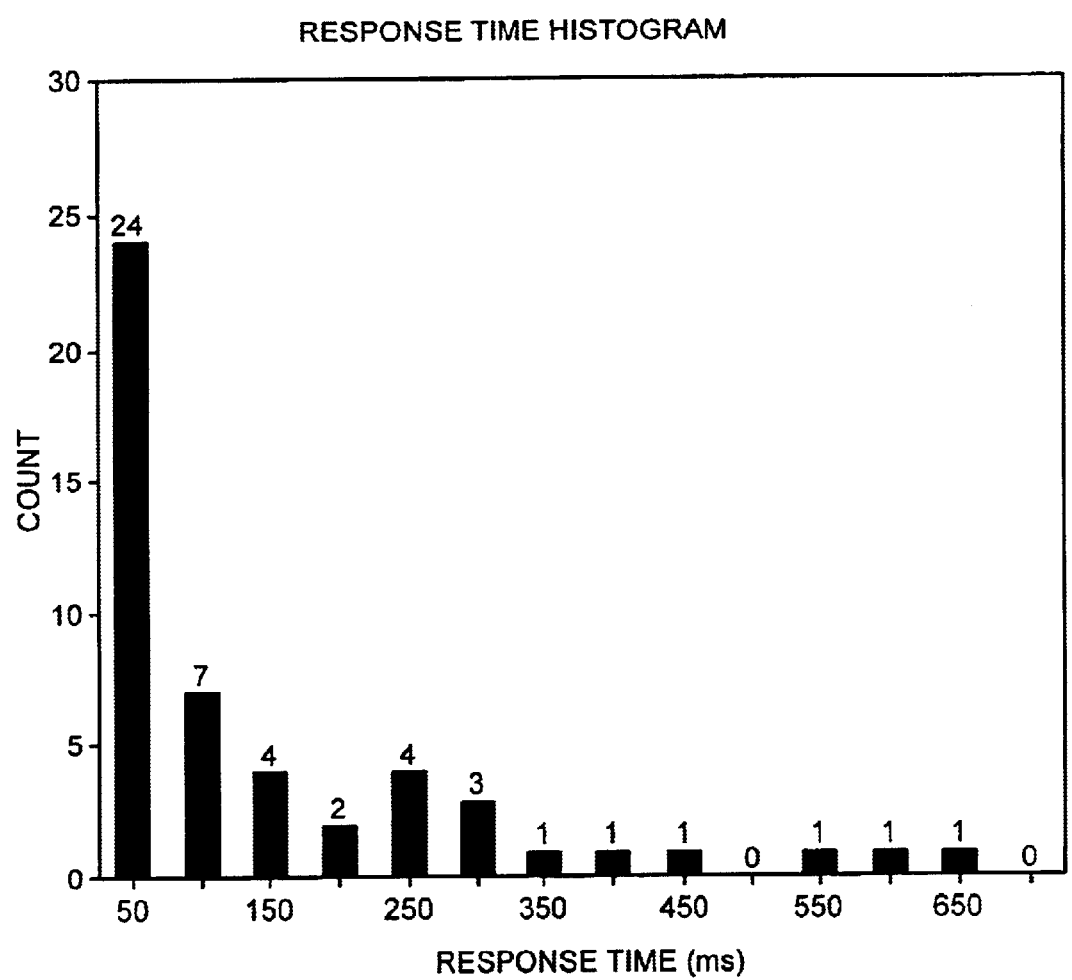
Figure 15:
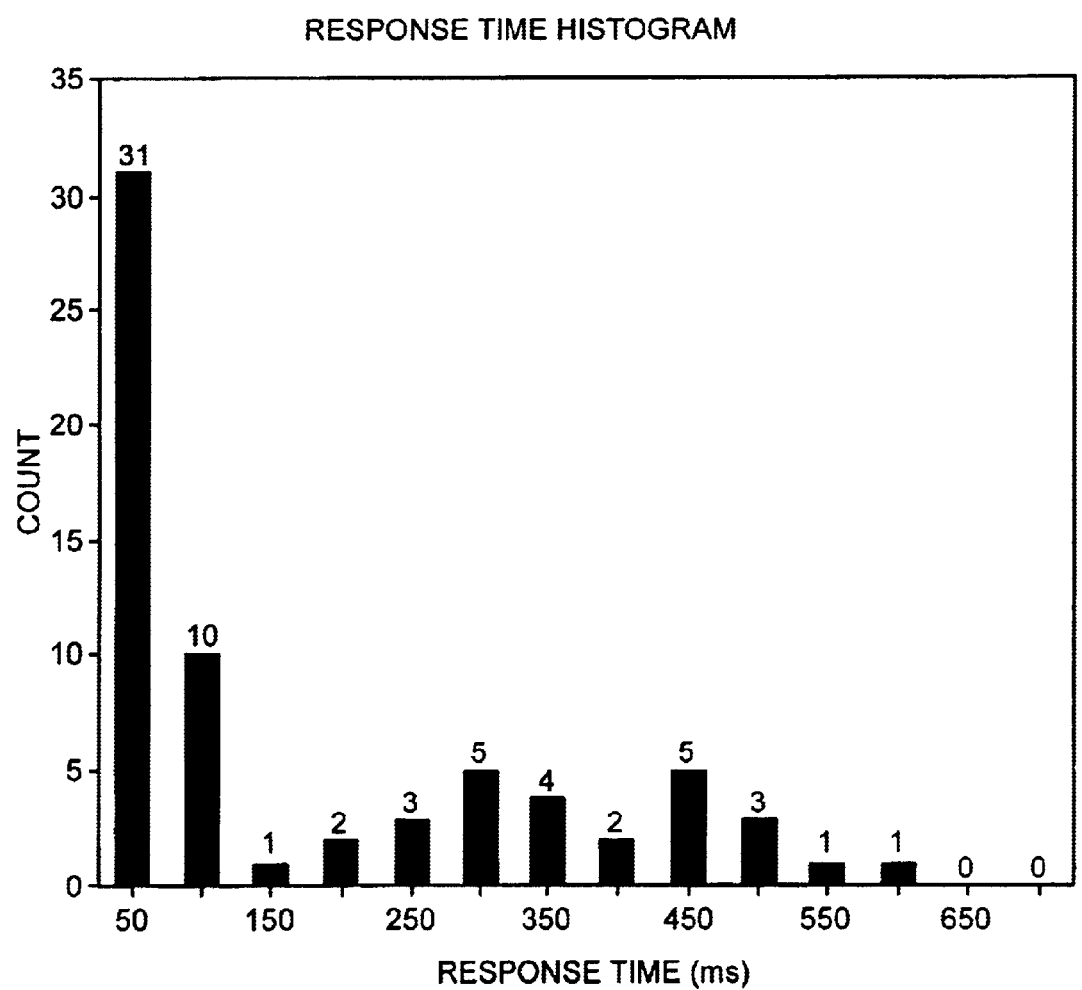

In FIGS. 14—15, histograms are shown for response times at 3:00 PM to 4:00 PM and at 2:00 AM to 3:00 AM, respectively. The histograms represent 50 and 68 samples and have ninetieth percentile values of 390 milliseconds and 471 milliseconds, respectively.

In an analysis of network performance data from discrete data samples collected from data collectors, the higher the sampling frequency, the better the analysis. The minimum sampling frequency for effective detection of a periodic pattern is stated by the Nyquist Theorem, expressed below.

$$f_s \geq 2f_m$$

In the expression, $f_s$ represents the sampling frequency and $f_m$ represents the maximum frequency of a periodic pattern that may be detected from the sampled data. The inverse of the sampling frequency is the amount of time between consecutive samples and is known as the sampling interval. Thus, if the sampling interval is 15 minutes, the Signature detection technique can detect a business cycle that is 30 minutes or longer.

The 15-minute sampling interval corresponds to a frequency of four samples per hour. In at least some cases, it is advantageous if the Signature detection technique is not performed until a minimum number of samples are collected (i.e., until a minimum samples requirement is met). Thus, for example, for a thirty-day period, the Signature detection technique may not be performed until 120 samples are available, which can be reached early by increasing the sampling frequency.

A shorter or longer sampling interval such as 5 minutes or 30 minutes may be used to improve the chances that each data sample will fall within a useful range of values.

In a specific embodiment, in the case of network utilization such as in a local area network ("LAN") or a wide area network ("WAN"), a Signature is detected if the standard deviation of the samples is less than 5% of the maximum possible utilization. Use of a fixed standard deviation threshold such as 5% imposes a less stringent standard in the lower portion of the utilization range than in the higher portion of the utilization range. For example, if the mean value is equal to 10% of the maximum possible utilization, it is highly likely that the standard deviation will be less than 5%; however, if the mean value is equal to 60% of the maximum possible utilization, a standard deviation of 5% is found only where the samples have a strong central tendency, which is recognized by the Signature detection technique. In the case of a Gaussian pdf, at least 66% of sample values are within 5% of the mean value.

The following features may be found in specific embodiments. The Signature detection technique for response time measurements may differ for different response time ranges. For example, if the response time is expected to be less than 100 milliseconds, a Signature is detected if the standard deviation is less than 10 milliseconds; otherwise, a Signature is detected if the standard deviation value is equal to or less than ten percent of the mean value, i.e., if the following condition is satisfied:

$$\frac{\sigma}{\mu} \le 10\%, \text{ or } \sigma \le \mu * 10\%$$

The condition has a basis in the Gaussian pdf property that approximately 66% of the sample values in a Gaussian pdf fall between values equal to 90% and 110% of the mean value.

The Signature detection technique for daily volume or Forward or Backward Error Congestion Notification ("FECN" or "BECN") measurements may be similar to the Signature detection technique for response time measurements (i.e., the technique differs for different ranges). FECN and BECN notifications are generated in a flow control system to indicate network congestion; more FECN and BECN notifications are received as congestion increases.

A user of software that implements the Signature detection technique may be permitted to tune the parameters of Signature detection, e.g., to select 4% instead of 5% as the standard deviation threshold. In a specific embodiment, during monitoring, an exception that is produced when the 90th percentile threshold is in force may also be produced when the Signature threshold is in force, but exceptions associated with the Signature threshold are not invoked when the 90th percentile threshold is in force. The Signature and 90th percentile principles may be applied for the purposes of reporting, generation of exceptions or alarms, and capacity planning and trending.

In the case of exceptions, four different threshold configurations may be made available. In the first threshold configuration ("Signature/90th percentile"), each hour is associated with a 90th percentile exception threshold unless a Signature has been detected for the hour, in which case the hour is associated with a Signature threshold instead. In the second, third, and fourth threshold configurations ("90th percentile", "Average", and "Absolute", respectively), only the 90th percentile value, the average value, or an absolute value entered by the user, respectively, is used as a threshold base.

In the Signature/90th percentile, 90th percentile, and Average configurations, the actual threshold used is higher than the threshold base, by an amount ("delta") equal to a number of percentage points, which may be selected by a user. The delta may be relative to the threshold base, the mean, or a standard deviation value. Thus, the user can control the actual threshold to be used for exception evaluation. For example, where the Signature/90th percentile configuration is in effect, by selecting zero for the value of delta, the user can cause an alarm to be generated for any sample that differs by more than one standard deviation from the average value. In such a case, if the statistical distribution of the samples approximates a Normal pdf, an alarm is generated for any sample that has a value greater than an 84th percentile value or less than a 16th percentile value.

In general, a baseline is description of the track record of a measured value. In a specific embodiment, a Baseliner application is responsible for processing and applying statistical methods to raw data collected ("logged") by a data collector application, and the output of the Baseliner application is analyzed statistical baseline data, which is used by the data collector application, a report generator application, and a map application. The analyzed statistical baseline data is used by the data collector application to set and adjust alarm thresholds, by the report generator application to generator reports, and by the map application to display statistical information for selected key network devices.

The Baseliner application computes the 90th percentile value and other statistical data such as the mean, a maximum, and the variance, and executes the Signature detection technique. In particular, the Baseliner application calculates a baseline using predefined formulas and rules applied to historical data (i.e., data samples) collected over a period of time. As described below, the baseline is typically calculated in one of two different ways: Day-By-Day Mode or Day-of-Week Mode. Other modes may be used as well or instead, particularly where it is appropriate to group together particular days such as business days or the first business day of a number of weeks.

The Day-By-Day Mode is a day insensitive mode specifying analysis of samples collected during the same hour on each of a number of preceding days as specified by a Duration value. For example, the hour may be 2:00 PM to 3:00 PM, and if the current day is Friday the 20th and the Duration value specifies four days, the preceding days may be Monday the 16 th through Thursday the 19th. The Day-Of-Week Mode is a day sensitive mode specifying analysis of samples collected during the same hour on the same day of a number of previous weeks as specified by the Duration value. For instance, the hour may be 2:00 PM to 3:00 PM, and if Monday is specified and the Duration value indicates four days, the days may be Monday the 2nd, Monday the 9th, Monday the 16th, and Monday the 23rd.

The following charts show examples of the Day-By-Day and Day-of-Week Modes, each of which has a resolution of one hour.

| Type | Statistical Method | Duration |
| --- | --- | --- |
| Day-By-Day: | | |
| 7 Day Maximum | Maximum | 7 days |
| 30 Day Maximum | Maximum | 30 days |
| 7 Day 90P | 90 Percentile | 7 days |
| 30 Day 90P | 90 Percentile | 30 days |
| 7 Day Mean | Average | 7 days |
| 30 Day Mean | Average | 30 days |
| Day-By-Week: | | |
| Six weeks Maximum | Maximum | Six weeks |
| Six weeks 90P | 90 Percentile | Six weeks |
| Six weeks Mean | Average | Six weeks |

Current baseline information is stored in a ColBaseline table, in which the data is updated each night and is used for real-time thresholding and alarming. Historical baseline information is needed for baseline comparisons from month to month and for variance checking for trending and capacity planning. The Baseliner application performs monthly baselining once each month. Thus, for example, historical baseline information for the month of January can be subtracted from historical baseline information for the month of June to produce baseline information showing growth or other changes from January to July.

For the Day-By-Day baseline mode, monthly baseline data is computed once each month for the calendar month regardless of the Duration value. For the Day-Of-Week mode, the baseline data for a period defined by the Duration value and terminated at the end of the month is computed once each calendar month, at the beginning of the next month. In either case, monthly baseline data for up to twelve months is stored in a Bs1History table.

If a Signature is detected, the mean value is used as the baseline value in the baseline data.

A BSLControl table drives the BaseLiner application by providing target identity information (GroupId, ObjId, InstId); a parameter to be monitored (EXPID) such as utilization, value, or delay; the Duration value (TimId); and an indication (Baseline Mask) of the statistical methods to be applied.

| GroupId | ObjId | InstId | ExpId | Baseline Mask | TimId |
|---------|-------|--------|-------|---------------|-------|
| 0 | 0 | 0 | 1 | 15 | 1 |
| 0 | 0 | 0 | 2 | 15 | 1 |
| 0 | 0 | 0 | 3 | 15 | 2 |
| 0 | | | | | |
| 0 | 0 | 0 | 1 | 3 | 25 |
| 0 | 0 | 0 | 2 | 3 | 26 |
| 1 | 0 | 0 | 3 | 3 | 48 |

The BaselineMask value is a bit array in which each bit indicates whether a particular configuration is in effect and therefore is dependent on calculations of certain statistics.

bit0: Average
bit1: Absolute
bit2: 90 p
bit3: Signature

A TimeId variable indicates time information for the Baseliner application, and is defined in a Time Table having a Type value that indicates which baselining mode, such as Day-By-Day or Day-By-Week, is in effect, Start and Stop values (each having a data type time_t) that indicate start and stop times for a time period for a particular value of TimeId, Custom and Time Interval values that are mode-specific and may be used to indicate the day of the week in the Day-By-Week mode and the effective interval for a particular TimeId value, respectively, the Duration value (also having a data type time_t), and an ExcId (Exception Id) value that indicates records in an exception table that specify exception dates.

In specific embodiments, the effective interval indicated in the Time Table may be one hour or 30 minutes, the start time may be on the hour, such as 0:00, or not on the hour, such as 0:15, 0:45, or 1:15, and the Time Interval value may be used as an index into a computer memory to provide for speedy storage of measurement samples. For example, an hourly interval may cause samples to be taken at 0:15, 1:15, and 2:15 and a 30 minute interval may cause samples to be taken at 0:15, 0:45, and 1:15.

In connection with such use of the time interval value, an hourly interval is handled differently from a 30 minute interval. Where an hourly interval is in effect, an integer form of the hour value serves as the index:

TimeID[hour]=TmID, Time Value [hour]=Hour:Minute

Where a 30 minute interval is in effect, an initial minute value less than 30 is handled differently from an initial minute value greater than or equal to 30. The initial minute value is the minute value of the time of the initial instance of taking of samples in a sequence of takings of samples, such as 05 for a sequence starting with an instance of a taking of samples at 0:05, or 35 for a sequence starting with an instance of a taking of samples at 0:35. For an initial minute value less than 30, an integer sum of twice the hour value and the minute value divided by 30 serves as the index:

Index=2*hour+minute/30

For a minute value greater than or equal to 30, an integer equal to one less than the sum of twice the hour value and the minute value divided by 30 serves as the index:

Index=2*hour+minute/30−1

The ColBaseLine table holds processed baseline values used by the data collector application for thresholding and alarming. These processed baseline values are also made available to the user in an HTML report form that may be displayed by a browser.

| OBJID | INSTID | EXPID | TIMEID | AVERAGE | MAX | NINETYP | SIGNATURE | ACTIONID |
|-------|--------|-------|--------|---------|-----|---------|-----------|----------|
| 10 | 1 | IDutil | 1 | Value | Value | Value | Yes | 9000 |
| 10 | 2 | IDutil | 1 | Value | Value | Value | Yes | 9000 |
| 10 | 1 | IDvol | 1 | Value | Value | Value | No | 9001 |
| 10 | 2 | IDvol | 1 | Value | Value | Value | Yes | 9001 |
| 10 | 1 | IDutil | 2 | Value | Value | Value | Yes | 9000 |

The MAX field holds the highest value recorded for a specific time period ("time slot") identified by the TimeId value. The NINETYP field records a value that is greater than 90% of the samples collected in the specified time slot (i.e., the 90th percentile value). The AVERAGE value records the mean value of the samples logged in the specified time slot. The SIGNATURE value indicates whether a Signature has been detected for the specified time slot.

The Bs1History table is used to store the weekly and monthly historical baseline values in order to support the generation of reports on demand. In a specific embodiment, the table stores up to five weekly baseline values and twelve monthly baseline values for each baseline object. A weekly or monthly baseline value is stored when a Baseline Control table receives a seven days or thirty days baseline request.

| OBJID | INSTID | EXPID | TIMEID | AVERAGE | MAX | NINETYP | SIGNATURE | TIMESUND | MONTH |
|---|---|---|---|---|---|---|---|---|---|
| 10 | 1 | Idutil | 1 | Value | Value | Value | Yes | time | 0 |
| 10 | 2 | Idutil | 1 | Value | Value | Value | No | time | 0 |
| 10 | 1 | Idvol | 1 | Value | Value | Value | No | 0 | 1 |
| 10 | 2 | Idvol | 1 | Value | Value | Value | Yes | 0 | 1 |
| 10 | 1 | Idutil | 2 | Value | Value | Value | Yes | 0 | 1 |

In the table, the TIMESUND value stores a timestamp value for when the Baseliner application was initiated, such as at a particular time on Sunday, and the previous week's baseline value was stored. The MONTH value indicates the month of year for which the baseline value is computed.

In a specific embodiment, the Baseliner application is scheduled to execute every night in order to provide up-to-date baseline information. Depending on the number of network devices and interfaces that are monitored, the time required to perform baselining computations for all of the statistics may be quite long, which may affect other components' operations. To help alleviate such effects, a fan out procedure may be executed by the application. For instance, after a baseline procedure is executed daily for N days, if the time required to perform baselining computations exceeds a time limit, baselining computations for all or some of the statistics are performed only on days specified in the BslControl table. For example, the following schedule may be used.

| Statistics | Monday | Tuesday | Wednesday | Thursday | Friday | Saturday |
|---|---|---|---|---|---|---|
| Volume/Utilization | X | | | X | | |
| Frame Relay | | X | | | X | |
| RMON1/RMON2 | | | | | | X |
| Response Time | X | X | X | X | X | X |

In at least some cases, especially where the user deploys software components at different times, it is advantageous if the fan out procedure is implemented for each statistics category so that each set of statistics is computed daily for N days before the fan out procedure starts. For example, if a Frame Relay manager component is deployed six months after an initial deployment of other components, the baseline procedure for Frame Relay is performed daily for N days even if other statistics are being handled by a fan out procedure, so that baseline data is available the next day.

Two adjustable parameters are stored in an NpOption table and control when the fan out procedure starts:

1. The number of days the baseline procedure was executed daily. For each category, daily execution of the baseline procedure is required for the first N days.
2. Maximum Baseline Time: the time limit for executing the baseline procedure each time.

In a specific embodiment, a fan out procedure for a particular set of baselining computations starts only when the following two conditions are met:

The baselining computations have been executed for N days.

The time required to perform baselining computations exceeds the Maximum Baseline Time.

A DOWMASK (Day of Week) mask field in the BslControl table is a bitmask indicating which day is scheduled for a particular ExpType. A sample of BslControl table follows, in which the sample values of DOWMASK shown are based on the sample schedule table above.

| GROUP_ID | OBJID | INSTID | EXPTYPE | BSL_MASK | TMID | DOWMASK |
|---|---|---|---|---|---|---|
| 0 | 0 | 0 | 1 | 15 | 73 | 18 |
| 0 | 0 | 0 | 2 | 15 | 73 | 18 |
| 0 | 0 | 0 | 4 | 15 | 73 | 127 |
| 0 | 0 | 0 | 9 | 15 | 73 | 127 |
| 0 | 0 | 0 | 10 | 15 | 73 | 127 |
| 0 | 0 | 0 | 11 | 15 | 73 | 127 |
| 0 | 0 | 0 | 1000 | 15 | 73 | 127 |
| 0 | 0 | 0 | 1001 | 15 | 73 | 127 |
| 0 | 0 | 0 | 1002 | 15 | 73 | 127 |
| 0 | 0 | 0 | 5 | 15 | 73 | 18 |
| 0 | 0 | 0 | 6 | 15 | 73 | 18 |
| 0 | 0 | 0 | 12 | 15 | 73 | 36 |
| 0 | 0 | 0 | 13 | 15 | 73 | 36 |
| 0 | 0 | 0 | 4201 | 15 | 73 | 72 |
| 0 | 0 | 0 | 4202 | 15 | 73 | 72 |
| 0 | 0 | 0 | 4000 | 15 | 73 | 36 |
| 0 | 0 | 0 | 4001 | 15 | 73 | 36 |
| 0 | 0 | 0 | 4006 | 15 | 73 | 36 |
| 0 | 0 | 0 | 4007 | 15 | 73 | 36 |
| 0 | 0 | 0 | 4401 | 15 | 73 | 72 |

-continued

| GROUP_ID | OBJID | INSTID | EXPTYPE | BSL_MASK | TMID | DOWMASK |
|---|---|---|---|---|---|---|
| 0 | 0 | 0 | 4007 | 15 | 73 | 72 |
| 0 | 0 | 0 | 4408 | 15 | 73 | 72 |
| 0 | 0 | 0 | 4409 | 15 | 73 | 72 |

The NpOption table (example below) is used to record baseline time information and baseline status information for each ExpType.

| FACILITY | OPT_NAME | OPTVALUE | OPTINTVL | OPTIONID | TVBSTAMP |
|---|---|---|---|---|---|
| 1 | Bs1_TimeInfo | | MaxBs1Time | StartTime | En |
| 1 | Bs1_Volume_Status | Success | N days required | 1st Bs1 Time | La |
| 1 | Bs1_Util_Status | | | | |
| 1 | Bs1_FR_Status | | | | |
| 1 | Bs1_RMON1_Status | | | | |
| 1 | Bs1_RMON2_Status | | | | |
| 1 | Bs1_RT_Status | | | | |
| 1 | Bs1_Volume_Monthly_Status | Success | | | La |
| 1 | Bs1_Util_Monthly_Status | | | | |
| 1 | Bs1_FR_Monthly_Status | | | | |
| 1 | Bs1_RMON1_Monthly_Status | | | | |
| 1 | Bs1_RMON2_Monthly_Status | | | | |
| 1 | Bs1_RTUtil_Monthly_Status | | | | |

In the Bs1_TimeInfo record, OPTINTVL indicates the time limit, such as one hour, for executing the baseline procedure, and OPTIONID and TVBSTAMP indicate the last baseline start time and end times, respectively.

In the records identified by a "Bs1" prefix and a "Status" suffix, OPTINTVL indicates the amount of time, which may be denominated in seconds, of daily execution of the baseline procedure is required before the fan out procedure is started, OPTIONID indicates a time when a baseline procedure was first executed for a particular ExpType, and TVBSTAMP and OPTVALUE indicate the end time and status, respectively, of the last set of baselining computations.

The technique (i.e., the procedures described above) may be implemented in hardware or software, or a combination of both. In at least some cases, it is advantageous if the technique is implemented in computer programs executing on one or more programmable computers, such as a personal computer running or able to run Microsoft Windows 95, 98, or NT, Unix, or MacIntosh OS, that each include a processor, a storage medium readable by the processor (including volatile and non-volatile memory and/or-storage elements), at least one input device such as a keyboard, and at least one output device. Program code is applied to data entered using the input device to perform the method described above and to generate output information. The output information is applied to one or more output devices such as a display screen of the computer.

In at least some cases, it is advantageous if each program is implemented in a high level procedural or object-oriented programming language such as C++ or Java to communicate with a computer system. However, the programs can be implemented in assembly or machine language, if desired. In any case, the language may be a compiled or interpreted language.

In at least some cases, it is advantageous if each such computer program is stored on a storage medium or device, such as ROM or magnetic diskette, that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, the computer resource involved may include persistent storage space, such as a hard disk, or may relate to error rates or instances of application or system inoperability ("crashes"). The network may include a wireless or broadcast network. The Signature detection technique may include a Fourier transform analysis of collected samples, e.g., to determine a minimum sampling frequency to be used.

What is claimed is:

1. A method for use in managing computer resources, comprising:

deriving values for a plurality of statistical variables from historical measurement information for a computer resource, the information associated with the same time period during a number of preceding days;

based on the values, determining whether a behavioral pattern for the computer resource is represented in the historical measurement information; and setting an alert threshold in response to the determination about whether a behavioral pattern for the computer resource is represented in the historical measurement information, such that, if the behavioral pattern for the computer resource is represented in the historical measurement information, the alert threshold is set based on a predetermined percentile value such that a certain percentage of the statistical variables have values less than that of the percentile value.

2. The method of claim 1, wherein the plurality of statistical variables includes a mean and a standard deviation.

3. The method of claim 2, further comprising:
if the value for the standard deviation satisfies a specified condition, determining that a behavioral pattern for the computer resource is represented in the historical measurement information.

4. The method of claim 3, wherein the specified condition includes a condition that requires the value for the standard deviation to be less than a specified value.

5. The method of claim 4, wherein a full range value is associated with the historical measurement information, and a fraction of the full range value serves as the specified value.

6. The method of claim 4, wherein a fraction of the mean serves as the specified value.

7. The method of claim 4, further comprising:
based on the value of the mean, determining a value to serve as the specified value.

8. The method of claim 4, further comprising:
based on the value of the mean, selecting, from a set of possible values, a value to serve as the specified value.

9. The method of claim 3, wherein the specified condition is adjustable by an end-user.

10. The method of claim 1, wherein on any particular day the alert threshold is in effect for a first period of the day.

11. The method of claim 1, wherein the setting of the alert threshold is also based on the value of the mean.

12. The method of claim 1, wherein the alert threshold represents a value above which an alert is warranted.

13. The method of claim 1, wherein the alert threshold represents a value below which an alert is warranted.

14. The method of claim 1, wherein the alert threshold represents a level of utilization.

15. The method of claim 1, wherein the alert threshold represents a response time.

16. The method of claim 1, further comprising:
sending an alert message after the alert threshold is crossed.

17. The method of claim 1, further comprising:
sending an alert message by push technology after the alert threshold is crossed.

18. The method of claim 10, further comprising:
based on the historical measurement information, setting another alert threshold, wherein the other threshold is in effect during a period of the day that is different from the first period of the day.

19. The method of claim 18, further comprising:
producing an illustration that indicates when the alert thresholds are in effect.

20. The method of claim 1, wherein the alert threshold is effective for a time period that is a multiple of approximately one hour.

21. The method of claim 1, further comprising:
using a time value as an index to store at least some of the historical measurement information.

22. The method of claim 1, further comprising:
basing the determination on a business day schedule.

23. The method of claim 1, wherein the historical measurement information includes information acquired from a network infrastructure layer.

24. The method of claim 1, wherein the historical measurement information includes information acquired from an EP services layer.

25. The method of claim 1, wherein the historical measurement information includes information acquired from an application layer.

26. The method of claim 1, wherein the historical measurement information includes information acquired from a computer network.

27. The method of claim 1, wherein the historical measurement information includes information pertaining to computer data traffic.

28. The method of claim 1, wherein the historical measurement information includes information acquired by use of a protocol substantially conforming to an SNMP standard.

29. The method of claim 1, wherein the historical measurement information includes information pertaining to a router interface.

30. The method of claim 1, wherein the historical measurement information includes information acquired from a packet counter.

31. The method of claim 1, wherein the historical measurement information includes information acquired by simulated use of the computer resource.

32. The method of claim 1, wherein the historical measurement information includes information acquired by actual use of the computer resource.

33. The method of claim 1, wherein the historical measurement information includes information acquired by simulated use of a Web application.

34. The method of claim 1, wherein the historical measurement information includes information pertaining to response time.

35. The method of claim 1, wherein the historical measurement information includes information acquired by use of a software agent.

36. The method of claim 1, wherein the historical measurement information includes information acquired by use of a dummy request.

37. The method of claim 1, wherein the historical measurement information includes information pertaining to a domain name server.

38. The method of claim 1, wherein the historical measurement information includes information pertaining to electronic mail.

39. The method of claim 1, wherein the time period is the same hour on each of a number of preceding days.

40. The method of claim 1, wherein the measurement samples associated with the time period are collected during the time period.

41. The method of claim 1, wherein the number of preceding days are each the same weekday of a number of preceding weeks.

42. The method of claim 1, wherein the number of preceding days are each one of a number of weekdays of a number of preceding weeks.

43. The method of claim 1, wherein the behavioral pattern comprises a signature.

44. The method of claim 1, wherein the percentile value is about the $90^{th}$ percentile.

45. Computer software, residing on a computer-readable storage medium, comprising a set of instructions for use in a computer system to cause the computer system to manage computer resources, the instructions causing the system to:
derive values for a plurality of statistical variables from historical measurement information for a computer resource, the information associated with the same time period during a number of preceding days;
based on the values, determine whether a behavioral pattern for the computer resource is represented in the historical measurement information;
setting an alert threshold in response to the determination about whether a behavioral pattern for the computer resource is represented in the historical measurement information, such that, if the behavioral pattern for the computer resource is represented in the historical measurement information, the alert threshold is set based on a predetermined percentile value such that a certain percentage of the statistical variables have values less than that of the percentile value.

46. A computer resources management system, comprising:
- a deriver that derives values for a plurality of statistical variables, from historical measurement information for a computer resource, the information associated with the same time period during a number of preceding days;
- a determiner that, based on the values, determines whether a behavioral pattern for the computer resource is represented in the historical measurement information; and
- a setter that sets an alert threshold in response to the determination about whether the behavioral pattern for the computer resource is represented in the historical measurement information such that, if the behavioral pattern for the computer resource is represented in the historical measurement information, the alert threshold is set based on a predetermined percentile value such that a certain percentage of the statistical variables have values less than that of the percentile value.

47. The system of claim 46, wherein the plurality of statistical variables includes a mean and a standard deviation.

48. The system of claim 47, wherein if the value for the standard deviation satisfies a specified condition, determining that a behavioral pattern for the computer resources are represented in the historical measurement information.

49. The system of claim 48, wherein the specified condition includes a condition that requires the value for the standard deviation to be less than a specified value.

50. The system of claim 49, wherein a full range value is associated with the historical measurement information, and a fraction of the full range value serves as the specified value.

51. The system of claim 49, wherein a fraction of the mean serves as the specified value.

52. The system of claim 49, further comprising:
- based on the value of the mean, determining a value to serve as the specified value.

53. The system of claim 49, wherein a value to serve as the specified value is selected from a set of possible values based upon the value of the mean.

54. The system of claim 48, wherein the specified condition is adjustable by an end-user.

* * * * *